Oct. 11, 1938.　　　　　G. P. LIST　　　　　2,132,425
MUFFLER
Filed June 22, 1936

INVENTOR
BY GEORGE P. LIST
ATTORNEY

Patented Oct. 11, 1938

2,132,425

UNITED STATES PATENT OFFICE 2,132,425

MUFFLER

George P. List, South Seattle, Wash.

Application June 22, 1936, Serial No. 86,487

6 Claims. (Cl. 181—46)

(Granted under the act of March 3, 1883, as amended April 30, 1928; 370 O. G. 757)

This invention relates to a muffler, and has for an object to provide an improved light weight and inexpensive muffler of very simple construction and high efficiency, for use in connection with internal combustion engines, particularly on vehicles such as boats, aircraft, land vehicles, etc.

A further object of this invention is to provide a muffler occupying a minimum of space and providing a maximum of efficiency.

A still further object of this invention is to provide a muffler which is made of two parts suitably fastened together, the two parts being substantially identical, and being made of suitable metal such as brass, steel, aluminum, or other fabricated metal.

As a further object of this invention, the muffler of this invention conducts the exhaust gases in a direction continuously away from the entrance, and at the same time spreads out the exhaust impulses to such an extent that they flow steadily out of the muffler well below the velocity of sound and with a complete absence of drumming.

With the foregoing and other objects in view, as will hereinafter become apparent, this invention comprises the constructions, combinations and arrangements of parts hereinafter claimed, disclosed and illustrated, wherein, Fig. 1 is an inside plan view of one of the muffler sections of this invention;

Figure 1:
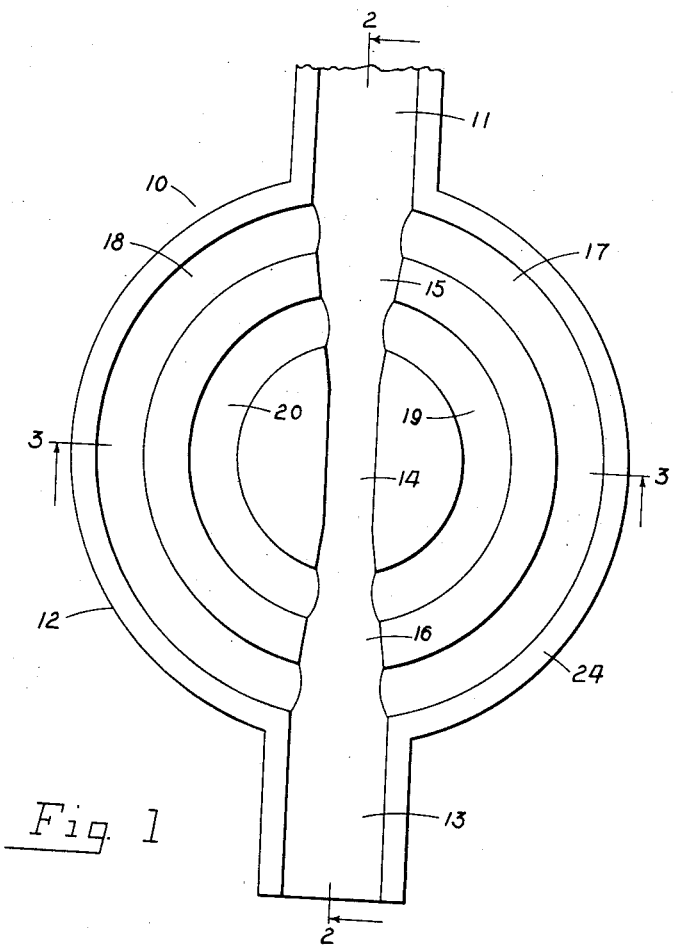
Figure 2:
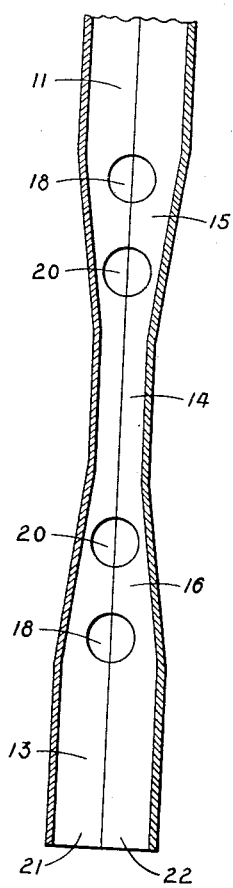
Fig. 2 is a complete sectional view on line 2—2 of Fig. 1.
Figure 3:
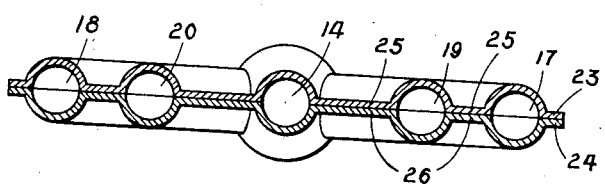
Fig. 3 is a complete sectional view on line 3—3 of Fig. 1.

There is shown at 10 the muffler of this invention, which includes an exhaust pipe 11 leading to the muffler body 12 and through the body 12 to the exhaust outlet pipe 13. As will be apparent from the drawing, the inlet and outlet pipes are substantially identical and hence interchangeable, so that the muffler may be connected up at either end.

Extending through the muffler body 12 from the pipe 11 and pipe 13 is a conduit 14, which is of a lesser diameter than the diameters of the pipes 11 and 13. Leading to the conduit 14 from the pipe 11 is a tapering conduit 15, and leading from the pipe 14 and pipe 13 is an expanding conduit 16. Semi-circular conduits 17 and 18, of a diameter substantially equal to that of the conduit 14, connect the entrance of the tapered conduit 15 to the exit of the expanded conduit 16. Concentric with the semi-circular conduits 17 and 18 is another pair of semi-circular conduits 19 and 20, which connect with the tapered conduit 15 and expanded conduit 16 close to the conduit 14.

The muffler 10, including the foregoing described pipes and conduits, is preferably formed by pressing the same out of metal in two complementary sections 21 and 22. Flanges 23 and 24 extending around the ends of sections 21 and 22 and webs 25 and 26, extending between the pressed out portions which form the conduits and pipe sections, provide a suitable means for securing the sections 21 and 22 together in any suitable manner, preferably by welding, it being understood, however, that any suitable clamping means may be substituted instead for securing the webs and flanges together and holding the muffler in assembled position.

This muffler 10 depends for its effectiveness upon the fact that a straight line is the shortest distance between two points. The exhaust gases entering through pipe 11 are divided as a result of the taper 15 so that part of them follow the semi-circular passages 17 and 18, 19 and 20, while a portion goes through the smaller conduit 14. That portion going through the smaller conduit 14 arrives at the expanding conduit 16 before the portions of the exhaust gasses flowing through the concentric conduits. Further, due to the Venturi effect of the tapered conduit 15 and the curvature of the concentric conduits, the exhaust gases will be traveling at different speeds as they reunite at the expanded conduit 16 to enter the muffler outlet pipe 13.

As will be obvious, the exhaust impulses will be thus spread out, for in reuniting the portion of the gas traveling through the conduit 14 will arrive at the expanded pipe 16 more quickly than that portion going through the concentric pipes 19 and 20, and, similarly, these reunited portions will arrive more quickly at the end of the expanded pipe 16 than those portions traveling through the outer concentric pipes 17 and 18. The exhaust impulses will thus be spread out and broken up to such an extent that they will flow smoothly and steadily out of the muffler 10 at 13 below the velocity of sound and with a complete absence of drumming, thus providing an efficient, light-weight and inexpensive muffler.

The invention described herein may be manufactured and used by or for the Government of the United States of America for governmental purposes without the payment of any royalties thereon or therefor.

I claim:

1. A muffler comprising an entrance pipe, an exhaust pipe, and a plurality of conduits connecting said entrance pipe to said exhaust pipe, said conduits being of lesser diameter than said entrance pipe, some of said connecting conduits being longer than the others of said connecting conduits, and a short, substantially straight conduit leading from said inlet pipe at one side to said outlet pipe at the opposite side, a tapering conduit connecting said inlet pipe to said straight conduit and an expanding conduit connecting said straight pipe to said outlet pipe, said longer conduits being semi-circular and leading from said tapering conduit to said expanding conduit.

2. A muffler comprising an inlet pipe, a muffler body and an outlet pipe at the opposite side of said muffler body from said inlet pipe, said muffler body including a plurality of conduits of a diameter smaller than the diameter of said inlet pipe, one of said conduits in said muffler body extending in a substantially straight line from said inlet pipe to said outlet pipe, a tapering conduit connecting said inlet pipe to said straight conduit, and an expanding conduit connecting said straight conduit to said outlet pipe.

3. A muffler comprising an inlet pipe, a muffler body and an outlet pipe at the opposite side of said muffler body from said inlet pipe, said muffler body including a plurality of conduits of a diameter smaller than the diameter of said inlet pipe, one of said conduits in said muffler body extending in a substantially straight line from said inlet pipe to said outlet pipe, a tapering conduit connecting said inlet pipe to said straight conduit, an expanding conduit connecting said straight conduit to said outlet pipe, and a plurality of concentric conduits connecting said tapering conduit to said expanding conduit.

4. A muffler comprising an inlet pipe, a muffler body and an outlet pipe at the opposite side of said muffler body from said inlet pipe, said muffler body including a plurality of conduits of a diameter smaller than the diameter of said inlet pipe, one of said conduits in said muffler body extending in a substantially straight line from said inlet pipe to said outlet pipe, a tapering conduit connecting said inlet pipe to said straight conduit, an expanding conduit connecting said straight conduit to said outlet pipe, and a plurality of concentric conduits connecting said tapering conduit to said expanding conduit, said concentric conduits being in the same plane, and said outlet pipe being of a diameter substantially equal to the diameter of said inlet pipe, whereby the exhaust impulses entering said muffler through said inlet body are spread out into said conduits and reunited in a steady flow into said outlet pipe.

5. A muffler body consisting of a number of complementary pressed metal sections, each pressed metal section comprising a plurality of semi-cylindrical conduits and a plurality of webs integrally connecting said semi-cylindrical conduits into a single section.

6. In a muffler body, a pressed metal section comprising a plurality of semi-cylindrical conduits, a portion of each conduit being spaced apart from a portion of each other conduit and a web integrally connecting each spaced apart portion of each conduit to that of the adjoining conduit.

GEORGE P. LIST.